(12) United States Patent
Barry et al.

(10) Patent No.: US 6,581,535 B2
(45) Date of Patent: Jun. 24, 2003

(54) AGRICULTURAL SEED METER

(75) Inventors: Alan F. Barry, Fairfax, IA (US); Russell A. Hagen, Victor, IA (US); Richard J. Vokoun, Lisbon, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 9 days.

(21) Appl. No.: 10/007,511

(22) Filed: Dec. 5, 2001

(65) Prior Publication Data

US 2002/0088383 A1 Jul. 11, 2002

Related U.S. Application Data

(60) Provisional application No. 60/254,035, filed on Dec. 7, 2000.

(51) Int. Cl.$^7$ .................................................. A01C 7/00
(52) U.S. Cl. ........................................ 111/181; 221/253
(58) Field of Search ................................ 111/181, 182, 111/183, 184, 185, 177, 178, 170; 221/211, 210, 218, 253, 254

(56) References Cited

U.S. PATENT DOCUMENTS

| | | | |
|---|---|---|---|
| 3,325,060 A | | 6/1967 | Rehder |
| 3,971,446 A | | 7/1976 | Nienberg |
| 4,664,290 A | * | 5/1987 | Martin et al. ............... 221/211 |
| 4,793,511 A | * | 12/1988 | Ankum et al. .............. 221/211 |
| 5,058,766 A | * | 10/1991 | Deckler ...................... 221/254 |
| 5,170,909 A | * | 12/1992 | Lundie et al. ............... 221/211 |
| 5,325,800 A | * | 7/1994 | Wisor et al. ................ 111/185 |
| 5,720,233 A | * | 2/1998 | Lodico et al. ............... 111/184 |
| 5,784,985 A | * | 7/1998 | Lodico et al. ............... 111/184 |
| 5,992,338 A | | 11/1999 | Romans |
| 5,996,515 A | * | 12/1999 | Gregor et al. ............... 111/174 |
| 6,176,393 B1 | * | 1/2001 | Luxon ......................... 221/211 |
| 6,273,010 B1 | * | 8/2001 | Luxon ......................... 111/184 |
| 6,481,647 B1 | * | 11/2002 | Keaton et al. ............... 239/654 |
| 6,516,733 B1 | * | 2/2003 | Sauder et al. ............... 111/180 |
| 2002/0043201 A1 | * | 4/2002 | Dunham ..................... 111/185 |

FOREIGN PATENT DOCUMENTS

EP 0156637 * 10/1985

* cited by examiner

*Primary Examiner*—Victor Batson
(74) *Attorney, Agent, or Firm*—Emrich & Dithmar

(57) ABSTRACT

An agricultural seed meter is disclosed including a seed selection mechanism in the form of a belt or a drum having pockets and moving through a seed reservoir area for loading seeds into the pocket. A cut-off brush is movable between a singulating position and a volume metering position so that the meter may be used either as a singulating meter or for volume metering without changing, deleting parts or adding parts. In either mode, seed release is accurate and repeatable through the use of a retainer brush for holding the seeds in their associated pocket until the pocket, in a downward, curving path, passed beyond the end of the retainer brush, thereby releasing the seeds into a discharge conduit.

24 Claims, 8 Drawing Sheets

AGRICULTURAL SEED METER

RELATED APPLICATION

This application claims benefit under 35 U.S.C. 120 of copending provisional application Ser. No. 60/254,035 filed Dec. 7, 2000 for AGRICULTURAL SEED METER.

FIELD OF THE INVENTION

This invention relates to agricultural seed meters; and in particular, to an agricultural seed meter using a belt or drum to either singulate individual seeds for planting, as is commonly done in row crop planters, or to meter a plurality of smaller seeds of the type normally dispensed in grain drills, or the like.

BACKGROUND OF THE INVENTION

U.S. Pat. No. 5,992,338 (Romans) discloses a meter of the type with which the present invention is concerned. In the belt meter disclosed in the '338 patent, a single belt is entrained around two sprockets of equal size and having their axes of rotation located in a common horizontal plane, thus providing a horizontal upper run of the belt for seed selection and a horizontal lower return section. One of the sprockets is driven by a conventional drive arrangement which drives the sprocket at a rate proportional to ground speed. Seed is deposited into cells or pockets on the belt from a loading area above the upper run of the belt, excess seeds are removed from the pockets by a brush. Each seed is slated in a pocket as the belt travels around one of the sprockets and the pocket opens to facilitate release of the seed as it moves about the other sprocket.

SUMMARY OF THE INVENTION

The present invention provides a number of improvements over the prior meter described above. The prior belt meter, although capable of "singulating" seed was not accurate enough to meter small seeds which are not singulated. Such smaller seeds are delivered in measured quantity (sometimes referred to as "volume metering"). As known in the art, larger seed, such as corn and soybeans, are separated or "singulated" from a reservoir of seeds. The seeds are delivered in a steady stream, ideally spaced at constant intervals. The ability of a meter to deliver seeds at a constant spacing reliably and repeatedly at varying ground speeds is widely accepted as the primary function of seed meters for such row crops as corn and soybeans.

Crops such as wheat and milo having smaller seeds are commonly planted by metering the seed in volume. Because of the size of these smaller seeds and the higher density at which they are planted, it is difficult to meter such seed by volume accurately and reliably at desired ground speed. Obviously, if accuracy is not affected, all other things being equal, the farmer desires to plant at higher speeds to improve productivity. Smaller seeds are usually planted with a different meter than are the larger seeds mentioned or, if the same meter housing is used, the seed selection medium is changed according to the seed desired to be planted.

The present invention improves the accuracy of singulating larger seeds and it also provides a mechanism for allowing the same meter to plant smaller seeds without having to remove or change any parts in the meter. Rather, a simple rotation of a brush, called the "cut-off" brush, from the singulating position to a volume metering position provides the changeover. The meters do not have to be removed from the planter, and no parts need be substituted in, added to or removed from the meter for the changeover.

Further, the belt embodiment of the present invention provides two seed delivery belts, arranged in side-by-side relation, to select and deliver the seeds. This enables the meter to be designed in a more compact arrangement for the same delivery capacity and ground speed.

The delivery belts are entrained about three sprockets, rather than two as in the prior art. This arrangement, with the axes of the sprockets arranged in a triangle, provides an upper, generally horizontal loading section or leg, a generally vertical delivery section, and an inclined return section. Seeds are received from the conventional seed hopper of the planter and moved under gravity into a buffer zone or area above the loading section of the belt, which is inclined slightly upwardly relative to the horizontal and in the direction of belt movement. A cut-off or singulating brush, when arranged in the singulating position, is located above the end of the loading section of the brush and inclined at an oblique angle relative to the loading section of the brush. The cut-off brush is positioned close to the belt to remove seeds not seated in the pockets of the belt and, because of the friction between the belt to remove unseated seeds. The oblique inclination of the cut-off brush, lifts the removed seeds for recirculation in the buffer zone.

The seated seeds are then conveyed downwardly to a lower sprocket where the belt moves around the lower sprocket; and the pockets are urged open to facilitate release of the seeds into a generally upright delivery tube. A retainer brush having bristles extending parallel to the direction of seed travel along the delivery leg retains the seated seeds in the pockets until they reach the end of the retainer brush at which point the belt travels around the lower sprocket. This arrangement provides for an improved accuracy in the release of the seeds which, in turn, permits the seeds to be released reliably and repeatedly over the inlet opening of the discharge tube. This, in turn, reduces seed "bounce" as the seeds drop through the discharge tube and into the formed furrow. The accuracy and repeatability of seed spacing in the furrow, for singulated seeds, is thus enhanced.

When the cut-off brush is moved to the volume metering position, it provides an opening for metering seeds which are seated in the seed pockets in fixed volume. The cut-off brush, in the volume metering position, defines an acute angle with the adjacent region of the belt to narrow the opening. This provides a conformance with the retainer brush which continues to retain the measured quantity of smaller seeds in the seed pockets until the belt reaches the release point, thereby providing an accurately measured and accurately released stream of seed delivered in volume or bulk form.

Other features and advantages of the invention will be appreciated as they are disclosed in the specification, accompanied by the attached drawing, wherein like reference numerals refer to like parts in the various views.

DETAILED DESCRIPTION OF THE ILLUSTRATED EMBODIMENT

Figure 1:
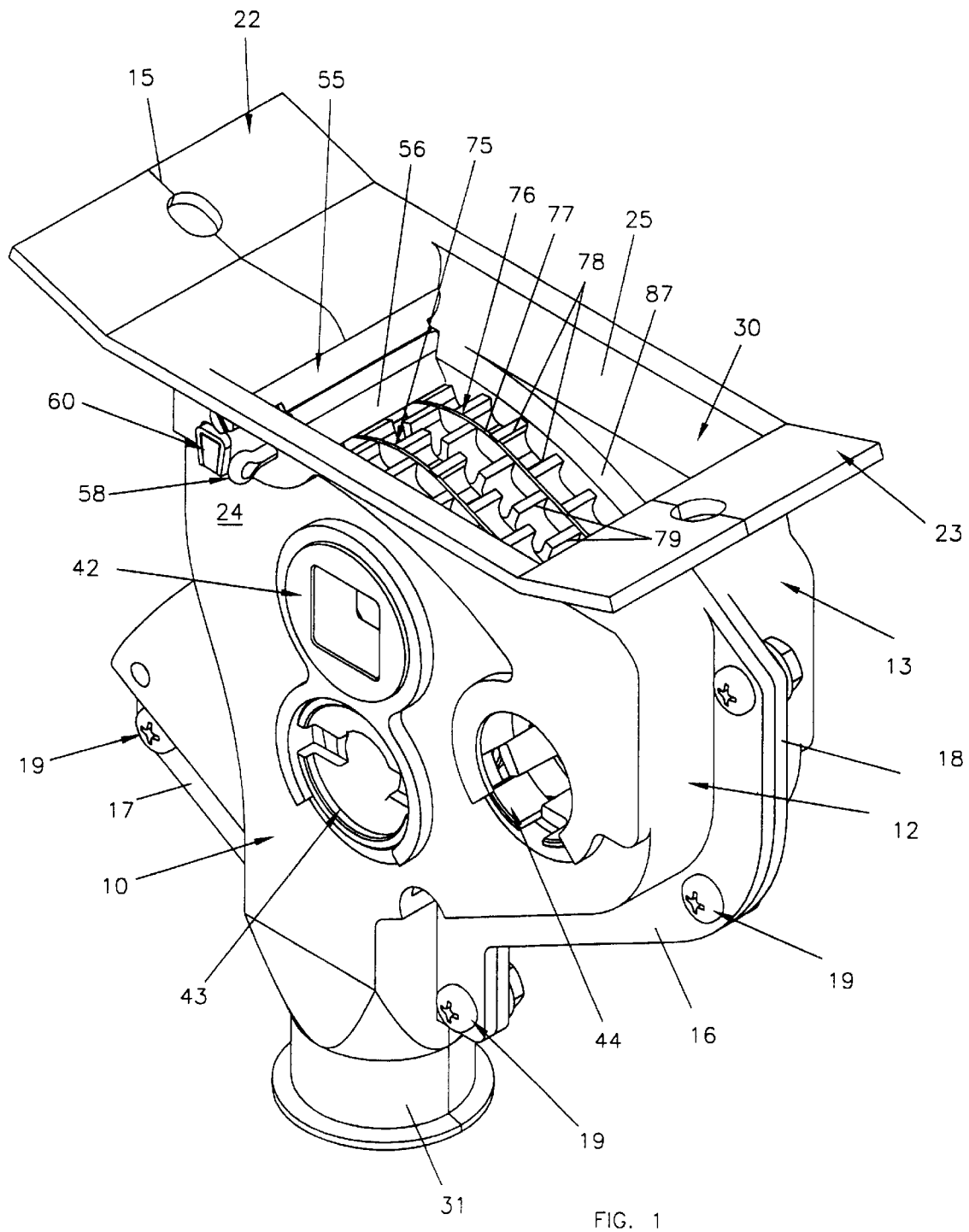
FIG. 1 is a perspective view taken from an upper, rear, left side perspective, looking at an angle into the meter from the top and with the cut-off brush in the singulating position.

Referring now to FIG. 1, reference numeral 10 generally designates a housing for the meter. The housing 10 is formed by molding complementary left and right sections generally designated 12 and 13, respectively. The left and right housing sections 12, 13 are joined along a vertical plane, the joinder line being illustrated at 15 in FIG. 1.

The left and right housing sections 12, 13 are formed with mating flanges such as those designated 16, 17 for the left side 12 and 18 for the right housing section 13 (the corresponding forward mounting flange for the right section not being seen in FIG. 1). The housing sections are held together by conventional fasteners such as the screw, lock washer and nut combinations shown at 19 in FIG. 1. Alternative forms of fastening are known to those skilled in the art, and as will be appreciated, the structure of the housing may vary widely within the principles of the invention, as will be further discussed below.

As can be seen best from FIG. 1, the upper portions of the housing sections 12, 13 cooperate to define a forward mounting flange generally designated 22 and a rear mounting flange generally designated 23 for mounting the meter to the bottom of a seed hopper, seed reservoir or other delivery structure such as a tube in an agricultural planter. The term "planter" is intended to be construed broadly to include both row crop planters (with individual hoppers or central distribution) and grain drills.

The left housing section 12 provides a left wall 24 for the meter, and the right housing section 13 provides a corresponding right wall 25. The walls 24, 25, as will be described, are not entirely flat throughout but simply sidewalls to define the meter. The forward mounting flange 22, rear mounting flange 23 and sidewalls 24, 25 define a seed inlet opening generally designated 30 for receiving seed from a storage hopper or other source on the planter. Further, the lower portions of the housing sections 12, 13 cooperate to define a generally cylindrical discharge conduit 31, the lower portion of which may be flanged, as illustrated, for mounting to a seed delivery tube which routes the seed, once delivered, to a furrow formed in the ground, as is commonly done in planters.

Figure 2:
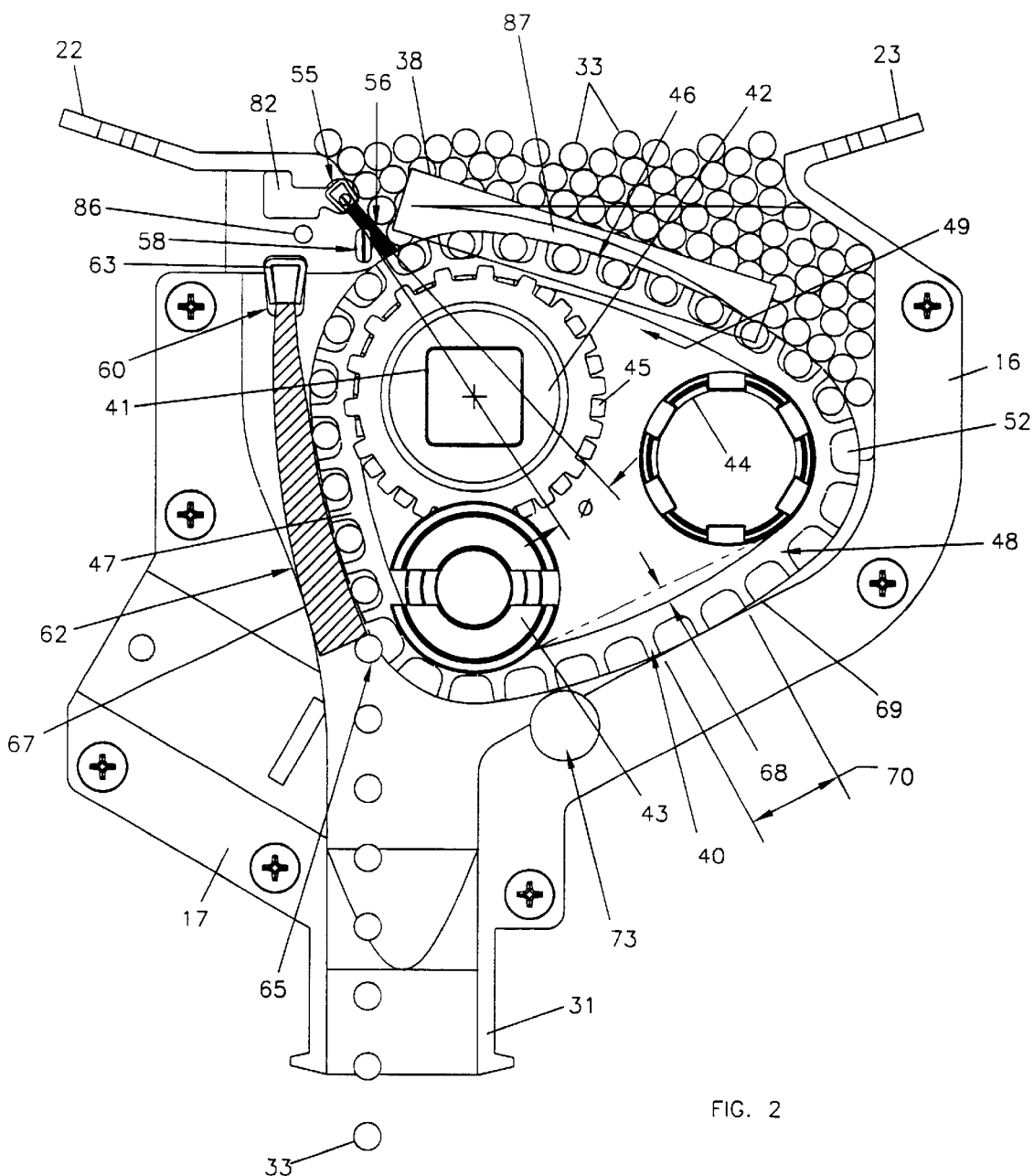
FIG. 2 is a left side elevational view of the meter of FIG. 1 with the sidewall of the meter removed to illustrate the interior of the meter.

Turning now to FIG. 2, the individual seeds are illustrated in idealized form as spheres 33. In the embodiment of FIG. 2, the seeds are large enough, such as soybeans or corn, that the meter singulates the seeds, as distinguished from smaller seeds which are metered by volume. That is, in the latter situation, more than one seed would be located in each seed pocket. Further, in FIG. 2, for the rectangular section 38, the seeds have been removed except for those which reside in the pockets, in order to illustrate some structure of the housing wall 25 as will be described below. When in use, the seed meter of FIG. 2 would be mounted either to a hopper or a reservoir, as mentioned, or fed continuously with a supply of seed. In any case, the seeds accumulate in the upper portion of the hopper which forms a buffer area in the region above and adjacent to the rectangular area 38—that is, where the seeds are illustrated above a seed selection belt generally designated 40. The belt 40 is entrained around three sprockets, including a main drive sprocket 42, a lower idler 43 and a rear idler 44.

The drive sprocket 42 is cogged as at 45 so that it engages the undersurface of the belt 40 and drives the belt. The drive sprocket 42 has a central aperture 41 which is generally square and which receives a corresponding drive lug from the planter to drive the sprocket 42 at a speed proportional to the ground speed of the planter, as is well known in the art since the present meter is intended, among other things, to replace existing seed meters in planters.

When the meter is mounted in its normal position, as seen in FIG. 2, the axes of rotation of the three sprockets 42–44 define a triangle, and the belt 40 includes three generally straight sections or legs, including an upper leg 46, a delivery leg 47, and a return leg 48. The axes of rotation of the three sprockets are such, as can be seen from the drawing, that the belt 40 (which is driven in the direction of the arrow 49) extends slightly upwardly as it proceeds forwardly (that is, to the left in FIG. 2).

The seeds are seated in pockets 52 formed in the belt 40. As the belt travels around the sprocket 44 to the beginning of the loading section 46, the belt is passed over the smaller curvature of the sprocket which opens each pocket to receive an individual seed. Thus, many of the pockets are filled in the forward portion of the loading leg or section of the belt. This removes seed from the right side of the buffer area causing seeds to move down toward the right. If some pockets are not filled in this region, the downward force provided by the weight of the seeds together with the movement of the seeds and the friction of the belt promotes filling any remaining pockets not yet filled. At the end of the loading section, there is located a cut-off brush generally designated 55 and including a plurality of bristles 56. The bristles 56, in the singulating position of the cut-off brush shown in FIG. 2, are generally perpendicular to the surface of the belt 40, and a cotter pin 58 is mounted in the planter housing immediately behind the bristles 56 so that no seeds can pass beneath the cut-off brush 55.

In addition, the direction of extension of the bristles 56 forms an oblique angle with the adjacent surface of the belt as it passes beneath the cut-off brush 55. The motion of the belt cooperates with the inclination of the bristles 56 to urge seeds which are propelled forwardly through engagement or friction with the belt, to move upwardly at the forward section of the buffer zone and returned to the queue of seeds being loaded into the pockets 52.

After the belt passes beneath the cut-off brush 55 and the cotter pin 58, it passes around the driven sprocket 42 and begins its journey down the delivery section 47 of the belt. A retainer brush generally designated 60 and including elongated bristles 62 extending in the direction of travel of the seeds is mounted to the housing by means of an elongated holder 63, described further below, to retain the seeds in the pockets 52 until the seeds reach the point of release which is designated by reference numeral 65.

Figure 6:
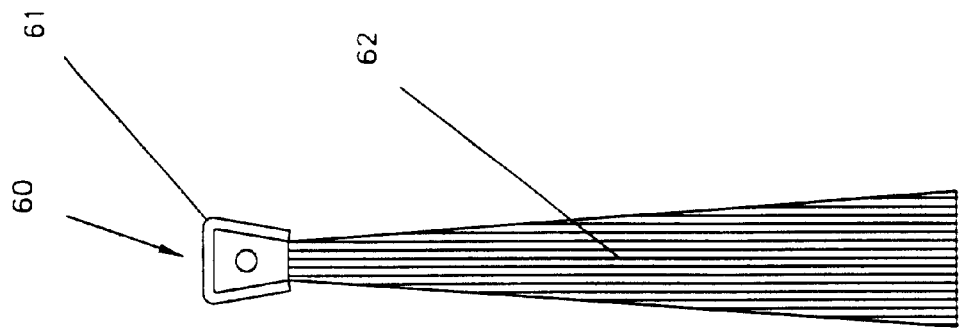
FIG. 6 is an end view of the retainer brush of FIG. 5.
Figure 5:
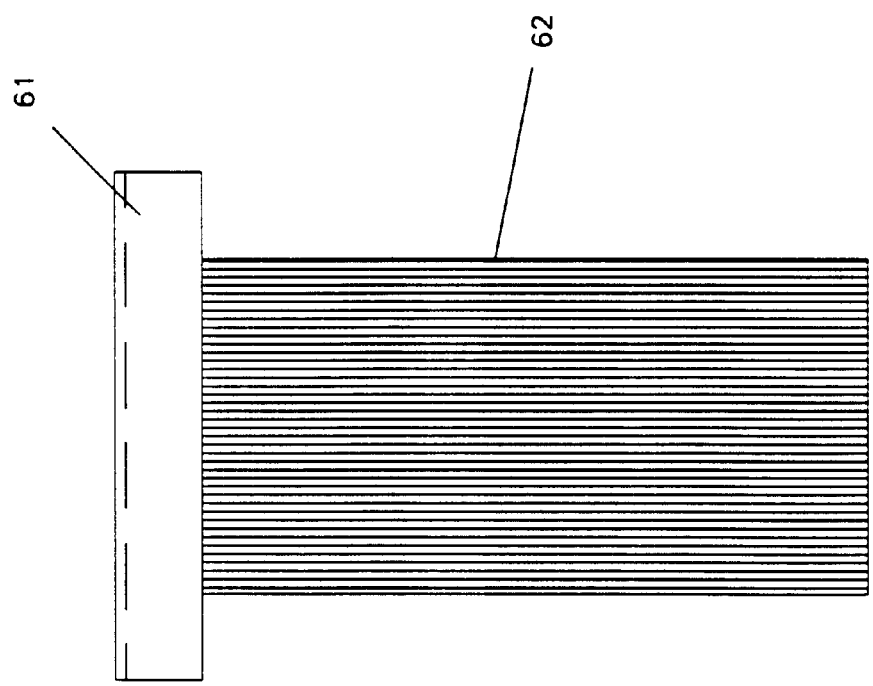
FIG. 5 is a side view of the retainer brush of the meter of FIG. 1.

Turning now to FIGS. 5 and 6, the retainer brush 60 also includes a holder 61 clamped to the upper edges of the bristles 62, as seen in FIG. 6, and extending laterally beyond the location of the bristles, as seen in FIG. 5. It will be observed that the lower portion of the retainer brush engages a section of the forward wall of the housing designated 67 which extends rearwardly to support the bristles 62 in retaining the seeds in the pockets. This has the further benefit that the toothed shape of the side of the belt 40 provided with the pockets 52 combs the bristles 62, thereby releasing fine particles and partial portions of broken seed into the discharge conduit 31, and cleaning the retention brush to enable it to operate effectively to retain the seed.

At the release point 65, the belt 40 is turned around the lower idler 43, which has a smaller diameter than the driven sprocket 42, thereby opening the pocket 52 to release the seeds 33. It will be observed that the release point is located at a point where the selection medium or conveying medium (i.e., the belt) is changing from a generally downward direction to a slightly upward direction. This further facilitates separation of the seed from the conveying medium at the desired release point.

The combination of these structural features provides an accurate release point for the seeds which is reliable and repeatable. An accurate, repeatable release point, in turn, provides that the seeds, in the singulated operating mode, are released in uniform separation, and because of the accuracy of the release, it is further assured that the seeds will be deposited along a vertical line extending through the discharge conduit 31, thereby minimizing contact with the interior walls of the meter housing and the discharge conduit 31. Any contact or "bounce" experienced by the seeds during discharge will obviously create a non-uniform spacing of the seeds during discharge, and thus, a non-uniform separation of the seeds in the furrow. This is undesirable for many crops, such as corn and soybeans, for which it is widely accepted that uniform spacing leads to uniform crop emergence and greater yield.

After the belt leaves the lower sprocket 43, it commences travel along the return leg 48. The belt 46 (actually, as will be described, there are two belts, side-by-side, comprising the overall seed conveyor) is molded in a circular shape and it is fit loosely around the sprockets such that the curvature of the belt is not entirely lost. This is illustrated in FIG. 2 by the separation indicated by the arrow 68. The chain line represents a tangential line between the support surfaces of the lower sprocket 43 and the rear sprocket 44, and it can be seen that the inner surface or web of the belt is slightly curved at a fairly large radius and is separated from the straight, tangential line. Thus, the belt bulges out slightly in an arc of fairly large radius. This permits the outer surface of the belt (i.e. the edges of the pocket walls) to engage the inclined rear surface 69 of the housing for a dwell space indicated by the arrow 70. This contact between the belt and the rear surface 69 when the pockets are empty of seeds forms a dynamic seal between the belt and the rear wall of the meter housing so that seeds cannot fall downwardly into the discharge conduit 31 from the buffer area above the belt. Further, if any seed remains in a pocket and has not been released, it may pass through this area unrestricted since the belt is free to flex away from the surface 69. This permits the meter to operate smoothly and continuously even in such rare and unintended circumstances.

A transverse aperture 73 is formed in the rear wall of the housing 10 beneath the belt 40 and adjacent the inlet opening to the discharge conduit 31. If there is an obstruction in the discharge conduit or in the seed delivery tube or other delivery conduits in the form of a grain drill, seed accumulates in the discharge conduit 31 and builds up until it is discharged through the overflow aperture 73 onto the ground. This feature not only prevents damage to the belt which is rotating at a fairly high speed, but it provides a visual indicator to the operator that the seed is not being delivered to the furrow.

Returning now to FIG. 1, it can be seen that the belt 40, in the illustrated embodiment, comprises two individual belts designated respectively 75 on the left side and 76 on the right side. Each of these belts may be identical. Turning then to the belt 76, it includes a center separating wall 77, and a plurality of upright transverse separating walls 78 which define the seed pockets on the right side of the separating wall 77. The belt 76 also includes a plurality of transverse separating walls 79 on the left side of the median wall 77 to provide seed cells which are staggered relative to the seed cells defined by the walls 78.

Figure 4:
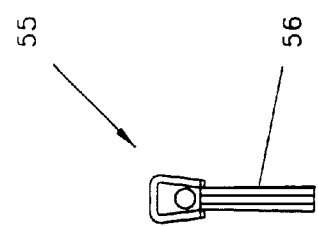
FIG. 4 is an end view of the cut-off brush of FIG. 3.
Figure 3:
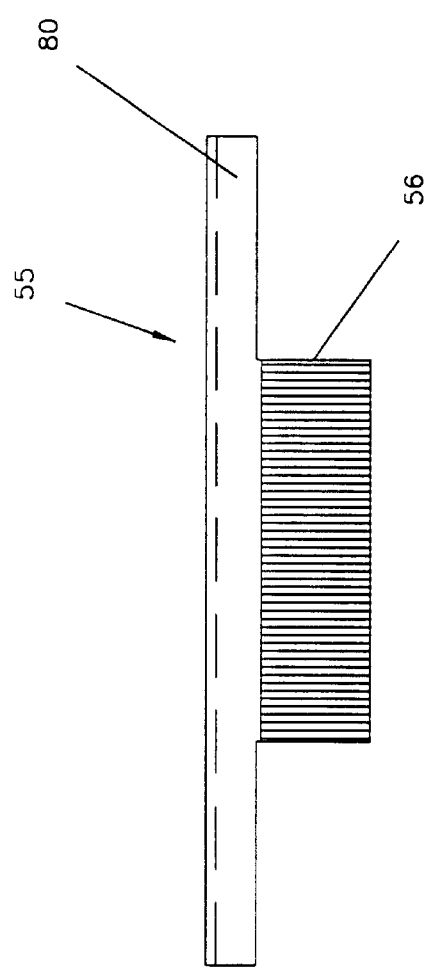
FIG. 3 is a side view of the cut-off brush of the meter of FIG. 1.
Figure 7:
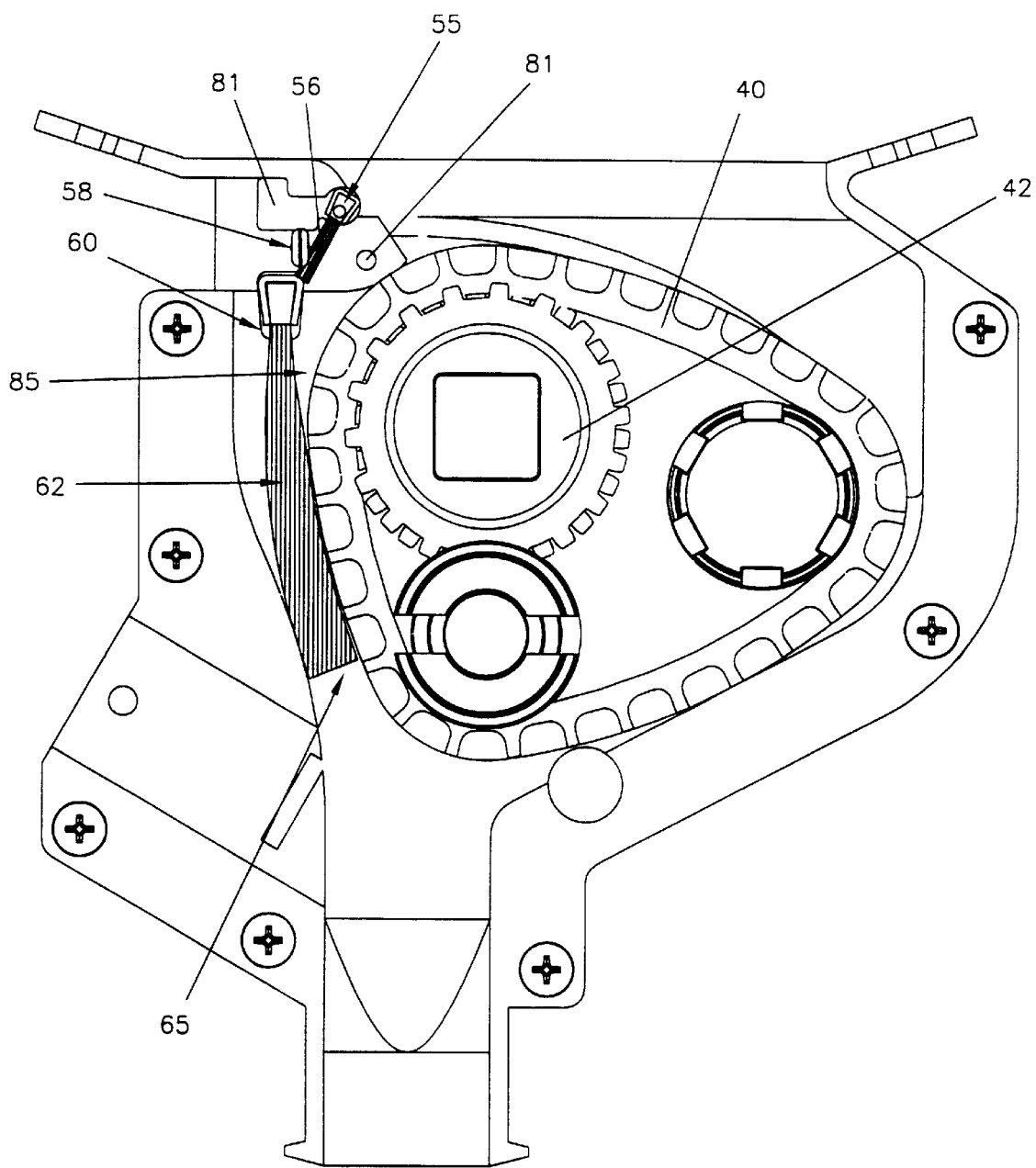
FIG. 7 is a left side view similar to FIG. 2, but with the cut-off brush in position for volume metering.

Turning now to FIGS. 3 and 4, the cut-off brush 55 includes a holder 80 which may be made of metal and which extends beyond the width of the brush, as seen in FIG. 3, to form spindles or trunnions which fits through apertures in the side of the housing, one of which is seen at 82 in FIG. 2. A corresponding aperture is formed in the left sidewall of the meter housing. The cotter pin 58 is likewise received in apertures formed in the left and right sidewalls of the meter housing. There is a second set of apertures, however, for receiving the cotter pin in a forward position, one such aperture being shown at 86 in FIG. 2 for receiving the distal or right side of the cotter pin 58. A corresponding aperture aligned with the aperture 86 is included in the left sidewall of the meter housing for receiving the cotter pin 58 in a forward position as illustrated in FIG. 7, the aperture 81 being for the cotter pin in the singulating position seen in FIG. 2. It will be observed from FIG. 2 the ends of the bristles 56 of the cut-off brush 55 in the singulating position engage the outer surface of the belt 40 to brush off unseated seeds.

In FIG. 7, the cut-off brush is rotated clockwise in the rear circular portion of the aperture 81 so that the bristles of the cut-off brush extend generally parallel to the outer surface of the belt 40 as it travels around the driven sprocket 42. It will be observed from FIG. 7 that the sides of the bristles 56 of the cut-off brush 55 thus cooperate with the belt 40 to form an opening for the seed, permitting the seed to move forward into a converging zone designated 85 and formed between the upper rear sides of the bristles 62 of the retainer brush 60 and the adjacent surface of the belt 40. Smaller seed enters the converging zone 85 and fills any of the pockets not already filled with seed by being compressed gently by the bristles of the retainer brush. Since the belt is carrying seed away from the buffer area continuously, there is no excessive build-up or back-up of seeds in the zone, and the delivery of seeds to the release point 65 is continuous and consistent, even for volume or bulk metering of seeds. The meter as shown in FIG. 7 when set up for volume metering operates otherwise as has already been described in connection with the singulating mode of seed metering explained in connection with FIG. 2.

Figure 8:
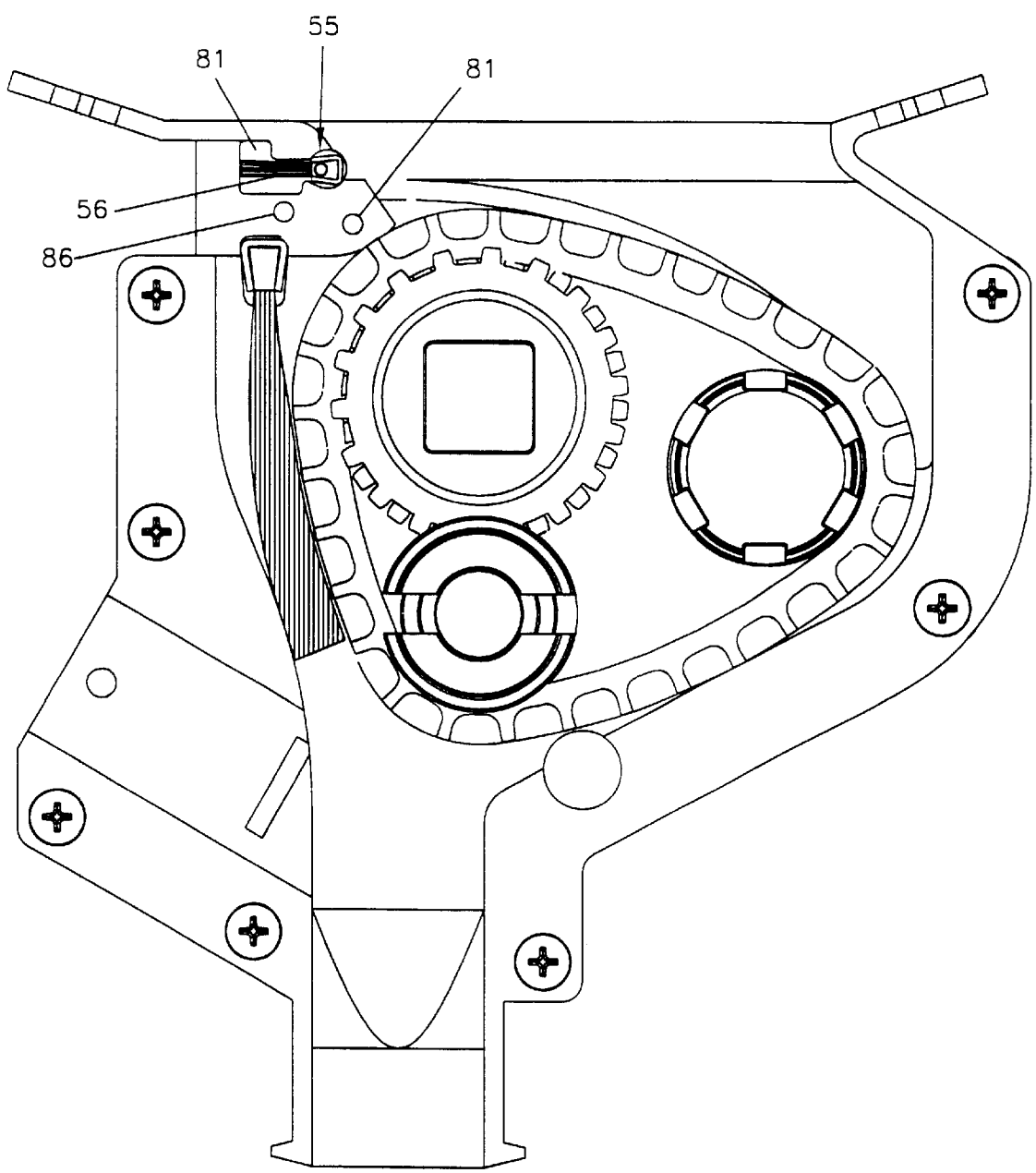
FIG. 8 is a view similar to FIG. 7 with the cut-off brush positioned for removal from the meter.

Turning now to FIG. 8, by rotating the cut-off brush counterclockwise to the horizontal position, the bristles 56 become aligned with the extension of the aperture 82, and it will be observed that the forward portion of the aperture 82 is enlarged so that if any of the distal ends of the bristles are curved in one direction or the other, the cut-off brush may nevertheless may be removed by sliding it in the aperture 82 perpendicular to the plane of the page of FIG. 8, and the brush may thus be fully removed from the meter for inspection or replacement.

As can be seen from FIGS. 1, 2 and 7, the right sidewall 25 of the meter housing is provided with a beveled surface 87 which has an inner edge adjacent the top of the seed belt 40 and which extends upwardly, proceeding away from the belt. This provides a funneling effect for seeds in the buffer area, guiding them inwardly toward the belt. In addition, the beveled area 87 extends adjacent the belt substantially throughout the loading area to avoid seeds from being trapped between the sidewall of the housing and the belt. A corresponding beveled area is provided on the left sidewall 24 of the housing, substantially the same as the one disclosed at 87.

Figure 9:
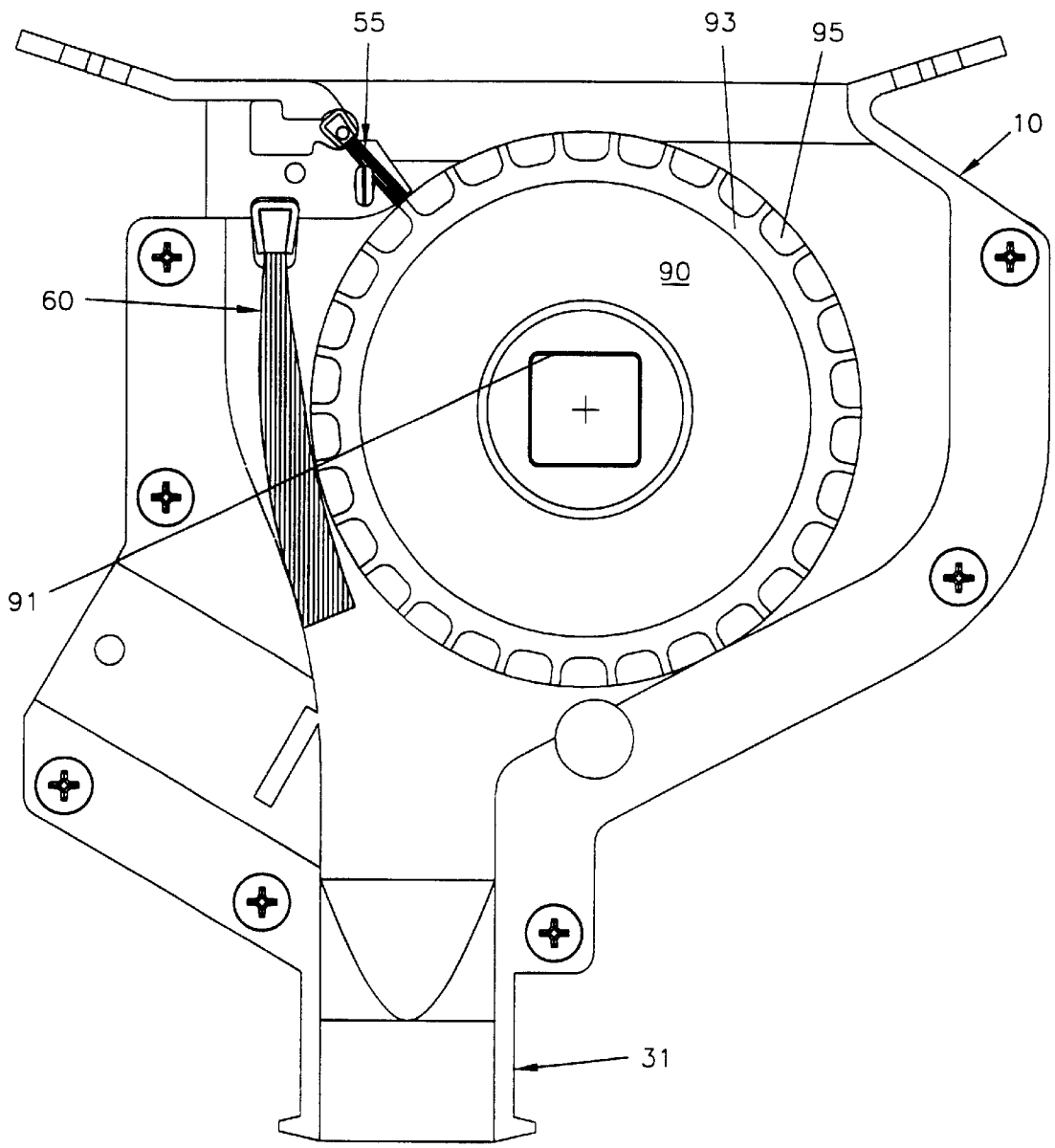
FIG. 9 is a side view of an alternative embodiment of the invention with the left wall of the meter removed, and including a drum rather than a belt as the seed selection and delivery medium.

Turning now to FIG. 9, there is shown an alternative embodiment in the invention wherein the meter housing 10, cut-off brush 55, retention brush 60 and discharge conduit 31 are substantially the same as has already been described. The primary difference is that the belt has been eliminated and the two idlers, namely, the lower idler 43 and the rear idler 44 have also been eliminated. Instead, a single drum 90 having a central, square drive aperture 91 is mounted and journaled directly in the sidewalls of the meter housing 10. The drum 90 includes an outer, circular covering 93 in which the seed pockets 95 are defined. The interior of the housing is modified to conform to the circular form of the drum 90, but the operation of the embodiment of FIG. 9 is substantially the same as that which has been already been disclosed.

The material used for the sleeve 93 forming the seed pockets may be a rubberized elastomer such as that sold under the trademark Santoprene®.

Figure 10:
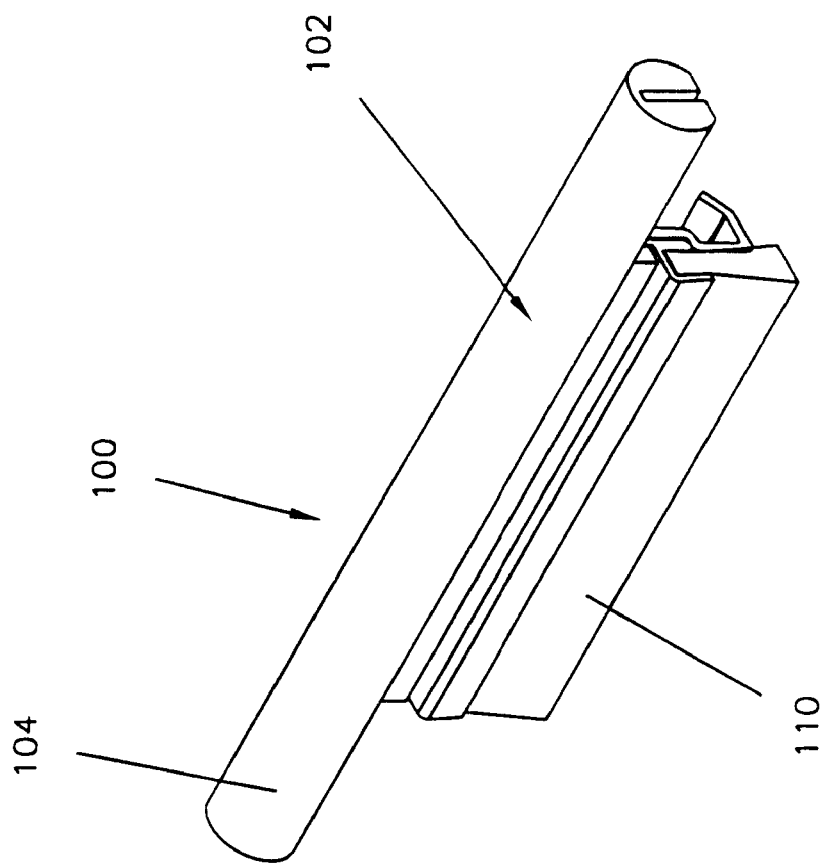
FIG. 10 is a perspective view of an alternative cut-off brush assembly.
Figure 11:
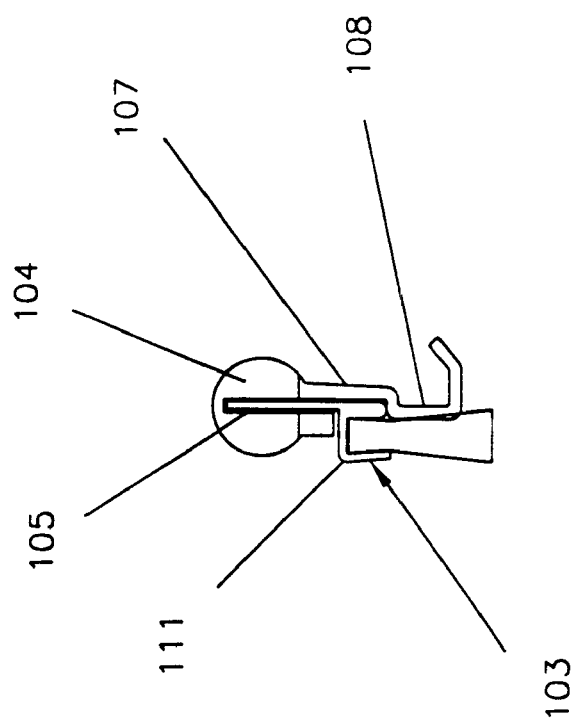
FIG. 11 is a side elevational view of the alternative cut-off brush assembly of FIG. 10.

Turning now to FIGS. 10 and 11, there is shown an alternative embodiment of a cut-off brush. In the embodiment of FIGS. 10 and 11, the cut-off brush assembly is generally designated by reference numeral 100, and it includes a holder 102 and a brush 103. The holder 102 includes a generally upper cylindrical transverse member 104 which defines a central slot 105. The transverse member 104 is in the form of a elongated rod or pin, and it acts as a pivot member, the ends of the member 104 extending beyond the width of the brush 103. The holder also includes a downwardly depending support 107 which provides a backing wall 108 for the side of the cut-off brush downstream in the direction of belt or drum travel. The brush 103 includes bristles 110 and h-shaped holder 111, the back of which fits into the slot 105 and is held by the upper portion of the backing wall 108 which, as best seen in FIG. 11, is located forwardly of the depending portion of the member 107 so as to brace and support the back of the holder 111.

Having thus disclosed in detail various embodiments of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

What is claimed is:

1. An agricultural seed meter comprising;
a housing providing an inlet for receiving seeds and a discharge opening for delivering seeds;
a seed carrying member in the form of an endless carrier having a plurality of seed pockets and adapted to be driven in a closed path to receive seeds in said pockets adjacent said inlet opening and delivering seeds to said discharge opening;
a cut-off brush having bristles with free ends, said cut-off brush being positionable in a singulating position when seeds of a relatively larger size are in said inlet, said free ends of said bristles engaging said carrier to remove excess seeds not seated in said pockets away from said carrier while permitting seeds seated in said pockets to pass to said discharge opening, said cut-off brush being further positionable to a volume metering position for seeds of a relatively smaller size, wherein said bristles of said cut-off brush are spaced from said seed carrying member to permit seeds to pass beneath said cut-off brush; and
a retaining wall between said cut-off brush and said discharge opening and located to engage said carrier and cover said pockets to retain seeds in said pockets.

2. The apparatus of claim 1 wherein said retaining wall comprises a retainer brush having bristles elongated in the direction of travel of said carrier.

3. The apparatus of claim 2 wherein said bristles of said retainer brush include free ends located to define a release position for seeds in said pockets as said pockets pass said free ends of said retainer brush.

4. The apparatus of claim 2 wherein said seed carrying member is a flexible belt, said meter further comprising:
a first sprocket mounted for rotation about a horizontal axis and located adjacent said inlet; and
a second sprocket mounted for rotation about a horizontal axis and located generally beneath said first sprocket to define a generally vertical delivery section of said belt, and wherein said retaining wall comprises a second brush having elongated bristles extending in the direction of travel of said belt and engaging said belt in said delivery section to retain said seeds in said pockets as said belt travels along said delivery section.

5. The apparatus of claim 4 wherein said second sprocket is located above said discharge opening and said belt is entrained about said second socket to travel in a generally downward direction before said second sprocket, and to travel in a generally upright direction after leaving said second sprocket; and
wherein said bristles of said retainer brush define free ends located adjacent said second sprocket to define a fixed seed release point for releasing seeds from said pockets to flow under gravity to said discharge opening, thereby to facilitate uniform and reliable release of said seeds from said pockets adjacent said free ends of said bristles of said retainer brush as said pockets open as they pass around said second sprocket and said belt changes direction.

6. The apparatus of claim 5 wherein said housing comprises a generally upright forward wall extending along said delivery section of said belt for supporting said retainer brush in operative relation relative to said belt.

7. The apparatus of claim 5 wherein said housing defines first and second sidewalls extending in generally vertical planes and located respectively on either side of said belt, said belt defining a loading section extending generally horizontally by and slightly upwardly in the direction of travel of said belt between said third and said first sprockets, said sidewalls of said housing extending adjacent said belt along said loading section and thence upwardly and outwardly of said belt to facilitate guiding seeds from said inlet on to said belt while preventing seeds from moving downwardly beneath said belt adjacent said loading section.

8. The apparatus of claim 4 further comprising a third sprocket mounted for rotation about a generally horizontal axis and located upstream in the direction of belt travel from said first sprocket and above said second sprocket and downstream therefrom in the direction of belt travel, axes of rotation of said first, second and third sprockets defining a triangle.

9. The apparatus of claim 8 wherein said housing comprises an inclined lower wall extending along the path of said belt from said second sprocket to said third sprocket, said belt made of a flexible resilient material and having a tendency to assume a rounded configuration, said belt extending outwardly between said second and third sprockets to engage said inclined wall of said housing and seal against the passage of seed from said inlet to said discharge opening.

10. The apparatus of claim 9 characterized in that said bristles of said cut-off brush extend at an oblique angle relative to the surface of said carrier member when said cut-off brush is in said cut-off position, thereby to promote a lifting and displacing motion of seeds adjacent said carrier member and outside said pocket, to recirculate such seeds.

11. The apparatus of claim 8 wherein said housing further defines an elongated slot communicating with apertures receiving the trunnion mount of said cut-off brush, said cut-off brush being adapted to be moved to a third position wherein the bristles of said cut-off brush are aligned laterally with said slot such that said cut-off brush may be removed from said housing by displacing said brush laterally along the axis of said trunnion mount for inspection, replacement or cleaning.

12. The apparatus of claim 8 wherein said carrying member comprises first and second belts located adjacent to one another and entrained about said first, second and third sprockets in juxtaposed relation.

13. The apparatus of claim 12 when each of said seed belts comprises first and second sets of pockets, arranged in staggered relation, each set of seed pockets extending around the periphery of said belt, wherein said meter is characterized as having four sets of seed pockets in laterally adjacent relation.

14. The apparatus of claim 4 wherein said first sprocket is adapted to be driven in rotating motion about a horizontal axis and wherein said cut-off brush includes a holder securing bristles, said holder extending laterally of said bristles to form a trunnion;

said holder being mounted in said housing for rotation between a first position in which said bristles extend generally normal to the direction of travel of said belt as said belt passes about said first sprocket, and a second position wherein said bristles of said cut-off brush extend generally parallel to the direction of travel of said carrier and are generally uniformly spaced therefrom to permit seeds to pass beyond said cut-off brush.

15. The apparatus of claim 14 further including an elongated brace member adapted to be secured to said housing adjacent the bristles of said cut-off brush in said first position, thereby to limit the movement of said bristles of said cut-off brush and prevent seeds outside said pockets from passing beneath said brush when said cut-off brush is in said cut-off position.

16. The apparatus of claim 1 wherein said housing includes an overflow aperture located adjacent said discharge opening and of sufficient size such that seeds accumulating above said discharge opening will flow through said overflow opening.

17. An agricultural seed meter including;
a housing having an inlet opening for receiving seed, an outlet opening for discharging seed and a generally upright wall between said inlet and outlet openings;
a drive sprocket journalled in said housing for rotation about a horizontal axis;
at least one idler sprocket below said drive sprocket and above said discharge opening;
a belt having a plurality of seed pockets and entrained about said drive sprocket and said idler sprocket to provide a generally downward delivery section transporting seeds between said drive sprocket and said idler sprocket to deliver seeds to a location above said discharge opening; and
a retainer brush mounted to said housing and having bristles extending in the direction of movement of said belt and engaging said belt to retain seeds seated in said pockets as said belt moves along said delivery section.

18. The apparatus of claim 17 wherein said housing is formed of two side sections defining said inlet opening adjacent the top thereof and said outlet opening adjacent the bottom thereof, said housing further defining a seed buffer zone above said belt, said belt defining a generally horizontal and sightly upwardly sloped loading section beneath said seed buffer zone.

19. The apparatus of claim 18 further comprising a third sprocket mounted for rotation about a horizontal axis, said third sprocket being an idle sprocket located to define an upstream end of said seed loading section of said belt.

20. The apparatus of claim 19 further comprising a cut-off brush mounted in said housing and having bristles extending oblique to the surface of said belt as said belt passes over said drive sprocket to move seeds not seated in pockets away from the surface of said belt and recirculating said seeds in said seed buffer zone above said belt.

21. The apparatus of claim 20 wherein said housing includes a lower wall extending from said discharge opening toward the rear of said housing, said belt characterized in bowing outwardly in a return section of said belt extending between said second and third idler sprockets to engage said lower wall of said housing and seal against the passage of seeds between said belt and said housing to said discharge opening.

22. The apparatus of claim 21 further comprising an overflow opening adjacent said discharge opening in said housing.

23. An agricultural seed meter comprising:
a housing defining an inlet opening for receiving seeds and a discharge opening;
first, second and third sprockets rotatably carried by said housing;
an endless conveying member defining a plurality of seed pockets and entrained about said first, second and third sprockets;
said first, second and third sprockets spaced to define a triangle including a seed loading section communicating with said inlet opening, a delivery section extending upstream of said discharge opening, and a return section extending from said discharge opening to said loading section;
one of said sprockets adapted to be driven in rotation and to drive said conveying member;
a brush engaging said conveying member adjacent the location between said loading section and said delivery section to displace from said conveying member seeds not seated in said seed pockets; and
a flexible member forming a retaining wall along at least a portion of said delivery section of said conveying member to retain said seeds in said pockets and defining a release location for said seeds to be deposited above said discharge opening.

24. An agricultural seed meter comprising;
a housing defining an inlet opening for receiving seeds and a discharge opening lower than said inlet opening for discharging seeds;

a seed carrying member having a plurality of seed pockets spaced about said member, said member adopted to be driven in a closed path to move said seed pockets in a generally vertical plane such that each of said pockets moves sequentially and repeatedly from a location adjacent said inlet opening to a location adjacent said discharge opening and thence to said location adjacent said inlet opening;

a first brush at a first position, said first brush having bristles engaging said seed carrying member adjacent said inlet opening and extending generally normal to the direction of travel of said seed carrying member at said first position; and a second brush located between said first position and said discharge opening, said second brush having bristles extending in the direction of movement of said seed carrying member and engaging said seed carrying member to retain seeds in said pockets as said pockets moves from a location adjacent said first brush to said discharge opening.

* * * * *